United States Patent [19]

Hoffman

[11] Patent Number: 4,847,533
[45] Date of Patent: Jul. 11, 1989

[54] LOW PRESSURE MERCURY DISCHARGE FLUORESCENT LAMP UTILIZING MULTILAYER PHOSPHOR COMBINATION FOR WHITE COLOR ILLUMINATION

[75] Inventor: Mary V. Hoffman, South Euclid, Ohio

[73] Assignee: General Electric Company, Schenectady, N.Y.

[21] Appl. No.: 126,317

[22] Filed: Nov. 30, 1987

Related U.S. Application Data

[60] Division of Ser. No. 827,215, Feb. 5, 1986, abandoned, which is a continuation-in-part of Ser. No. 562,670, Dec. 9, 1983, abandoned.

[51] Int. Cl.$^4$ ............................................. H01J 1/62
[52] U.S. Cl. ........................... 313/487; 292/301.4 R; 292/301.4 P
[58] Field of Search .................. 313/487; 292/301.4 R, 292/301.4 P

[56] References Cited

U.S. PATENT DOCUMENTS

| | | | |
|---|---|---|---|
| 3,937,998 | 2/1976 | Verstegen et al. | 313/487 |
| 4,005,328 | 1/1977 | Radielovic et al. | 313/487 |
| 4,032,812 | 6/1977 | Robayashi et al. | 313/487 |
| 4,075,532 | 2/1978 | Piper et al. | 313/487 |
| 4,079,287 | 3/1978 | Sonles et al. | 313/487 |
| 4,110,660 | 8/1978 | Wolfe | 313/487 |
| 4,258,285 | 3/1981 | Chenot et al. | 313/487 |
| 4,315,192 | 2/1982 | Skwirut et al. | 313/487 |
| 4,458,176 | 7/1984 | Chenot et al. | 313/487 |
| 4,527,087 | 7/1985 | Taya et al. | 313/487 |
| 4,602,188 | 7/1986 | de Hair et al. | 313/487 |
| 4,623,816 | 11/1986 | Hoffman et al. | 313/487 |

FOREIGN PATENT DOCUMENTS

| | | | |
|---|---|---|---|
| 0124501 | 9/1979 | Japan | 313/487 |
| 55166857 | 12/1980 | Japan | 313/487 |

Primary Examiner—Kenneth M. Schor
Assistant Examiner—L. Johnson
Attorney, Agent, or Firm—Edward M. Corcoran; Stanley C. Corwin; Fred Jacob

[57] ABSTRACT

A low pressure mercury discharge fluorescent lamp is disclosed utilizing a particular phosphor blend deposited on a calcium haloapatite phosphor base layer to achieve white color lamp illumination efficiently with improved color rendition. The surface phosphor layer is a blended mixture of a first phosphor which is divalent europium barium and/or strontium magnesium aluminate having a hexagonal crystalline structure and which further includes coactivation by divalent manganese ion sufficient to produce substantial green color emission with a second phosphor which is trivalent europium activated rare earth oxide having a rare earth ion selected from yttrium, gadolinium and lutetium, including mixtures of these rare earth ions. The underlying calcium haloapatite layer also exhibits emission at approximately the same color point as achieved with the surface phosphor layer.

8 Claims, 2 Drawing Sheets

LOW PRESSURE MERCURY DISCHARGE FLUORESCENT LAMP UTILIZING MULTILAYER PHOSPHOR COMBINATION FOR WHITE COLOR ILLUMINATION

This is a division of application Ser. No. 827,215, filed Feb. 5, 1986 now abandoned which is a continuation-in-part of Ser. No. 562,670 filed Dec. 8, 1983, now abandoned.

BACKGROUND OF THE INVENTION

The present invention relates generally to low pressure discharge fluorescent lamps providing white color illumination efficiently and more particularly to a novel phosphor combination producing such efficient illumination with improved color rendition. In providing said improvements, the present phosphor coating employs a calcium haloapatite phosphor base layer deposited on the inner wall of the lamp envelope over which is deposited a surface layer utilizing a particular two component phosphor blend.

The use of several phosphor materials in combination to produce a predetermined overall spectral energy distribution is well known. A recently introduced type of said lamp employs three phosphors each emitting in a relatively narrow spectral region to produce efficient white color illumination with a high degree of faithful color rendition. For example, in the U.S. Pat. No. 3,937,998 there is disclosed such a phosphor combination wherein a blended mixture of individual phosphors emitting in the blue, green and red color spectral regions combine to produce the desired white color lamp emission. The blue emission phosphor is said to be divalent europium activated barium and/or strontium magnesium aluminate having a hexagonal crystalline structure which can further include partial substitution of the magnesium ion with divalent manganese ion. The green emission phosphor is said to be a terbium activated aluminate having a hexagonal magnetoplumbite crystalline structure in which up to a maximum of 25 weight percent of aluminum may be replaced by gallium and/or scandium and magnesium may be entirely or partly replaced by zinc and/or beryllium as well as further include optional coactivation of said phosphor with cerium ion. The red emission phosphor in said phosphor combination is said to include rear earth oxides activated with trivalent europium wherein said rare earth ion is selected from at least one of the elements yttrium, gadolinium and lutetium. The composite lamp emission provided with said phosphor combination is said to provide color temperatures in the range from 2300° K. to 8000° K. with color rendering (CRI values) indices for said lamps being reported up to the value of 87. A multilayer coated fluorescent lamp using these phosphors is also disclosed in Japanese Pat. No. J54124—581. Said lamp employs a base layer of calcium halophosphate phosphor having a top coating deposited thereon formed with a phosphor mixture containing by weight 8-24% of europium-activated barium magnesium aluminate, 32-42% terbium-activated cerium magnesium aluminate, and 44-50% europium activated yttrium oxide. The coating weight ratio of the base layer to said top layer resides in the weight ration range 1:0.7-2.

In U.S. Pat. No. 4,005,328, there is still further disclosed a low pressure discharge fluorescent lamp employed for color copying by electrophotographic processes and which employs a single layer phosphor coating that is a blend of two of the above identified type phosphors. More particularly, said phosphor combination utilized various weight proportions of the europium-activated yttrium oxide phosphor or some other red color emitting rare earth phosphor and which is blended with a barium or strontium ternary aluminate coactivated with both manganese and europium ion to emit at limited wavelengths in the blue color and green color spectral regions. To match the sensitivity of the electrophotographic copying equipment, the blend proportions in said phosphor combination are said to be selected such that the proportion of the aluminate phosphor generally dominates.

SUMMARY OF THE INVENTION

It has now been discovered, surprisingly, that both efficient white color illumination along with improved color rendition at color temperatures in the approximate range 2700°-5000° K. is achieved in a low pressure discharge fluorescent lamp utilizing a multilayer phosphor coating of the above general type with particular modifications being made to the overall phosphor coating. Said modifications require both a change in the composition of the surface phosphor layer combined with modifying the weight ratios between the modified surface layer and the calcium haloapatite base layer. The compositional change made in the surface phosphor layer consists of eliminating the green phosphor component in the above-mentioned phosphor combination while modifying the blue emission phosphor component in said phosphor blend to produce substantial green color emission. Additionally, the weight proportions of the individual phosphor components in said modified phosphor blend are also required to be altered such that the weight proportion of the trivalent europium activated rare earth oxide exceeds the weight proportion of the now divalent europium and divalent manganese coactivated barium magnesium aluminate in said surface phosphor layer. Such modification enables white color lamp temperatures in the approximate range 2700°-5000° K. to be achieved in an efficient manner. The still further modification being required in the relative weight proportions between said modified surface layer and the calcium haloapatite base layer provides a minimum 73 CRI value for the composite lamp emission as compared with a 68 CR1 (color rendering index) value or less in a lamp having only the modified phosphor blend.

A suitable trivalent europium activated rare earth oxide phosphor in the present phosphor coating can have the rare earth ion selected from yttrium, gadolinium, and lutetium, including mixtures of said rare earth ions, having a trivalent europium activator level in the range 0.01-0.1 mole per mole of the phosphor. The preferred red color emitting phosphor in the present phosphor coating is trivalent europium activated yttrium oxide. A suitable barium magnesium aluminate phosphor component in the present phosphor combination has the following chemical formula as formulated:

$$Ba_{1-x}Eu_xMg_{1.95-y}Mn_yAl_{16}O_{27}$$

wherein
x is in the approximate range 0.1-0.4, and
y is in the approximate range 0.1-0.4.
As above indicated, the weight proportions for the rare earth oxide phosphor in the present phosphor blend exceed the weight proportions for the aluminate phosphor component in order to provide such white color points for the lamp emission as cool white, 3000° K., 3500° K. and still other white color points. To further achieve a minimum 73 CR1 value or greater in the lamp emission provided with the present overall phosphor coating requires that the proportions of the surface phosphor layer be maintained in the range from about 5 weight percent up to about 30 weight percent of said total phosphor coating weight. In said overall phosphor coating, the color point of the well known calcium haloapatite phosphor material employed for the base layer is adjusted to match the color point of the phosphor combination in the surface phosphor layer by variation of its activator levels in the customary manner.

The above defined present multilayer phosphor coating produces equal or higher color rendering index values than can be achieved with the aforementioned three phosphor blend being employed as the surface phosphor layer and at a reduced coating weight which is a distinct economic advantage. While phosphor coating costs have earlier been reduced by others with respect to multilayer coatings which employ said triphosphor blends as a surface layer, it was not expected that such could be achieved for a surface layer wherein the proportion of the trivalent europium activated rare earth oxide phosphor component predominates. It has also been found in connection with the present phosphor coatings that less of said red color emitting phosphor component is required in the overall phosphor coating to produce an objective color point than is required in prior art coatings employing said triphosphor blends. Such reduction of the red color emitting phosphor component in the overall lamp coating made possible with the present invention provides a still further cost reduction in the lamp manufacture.

DESCRIPTION OF THE PREFERRED EMBODIMENTS

Figure 1:
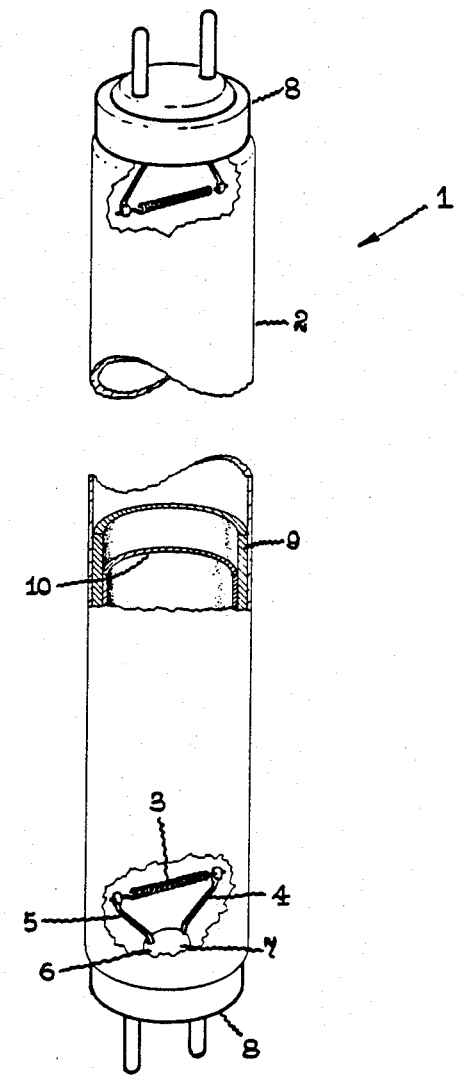
FIG. 1 is a perspective view partially broken away of a low pressure mercury discharge fluorescent lamp construction utilizing a phosphor coating in accordance with the present invention.

Referring to FIG. 1, there is shown a representative fluorescent lamp 1 comprising an elongated soda-lime silicate glass lamp envelope 2 having a circular cross-section. The low pressure mercury discharge assembly in said lamp has the conventional electrode structure 3 at each end supported by in-lead wires 4 and 5 which extend through a glass press seal 6 in a mount stem 7 to the electrical contacts of a base 8 fixed at opposite ends to the sealed lamp envelope. The discharge-sustaining filling in the sealed glass envelope is an inert gas such as argon or a mixture of argon and other gases at a low pressure in combination with a small quantity of mercury to provide the low vapor pressure manner of lamp operation. The inner surface of the glass bulb is provided with a base layer or coating 9 of calcium haloapatite phosphor, that is applied extending substantially the full length of the tube around the circumferential inner wall. The surface layer 10 of the present phosphor combination is deposited as a blended mixture on the phosphor base layer 9 at the above defined lesser coating weight utilizing conventional coating techniques.

To still better illustrate the degree of improvement obtained with the above described lamp embodiment, a number of the fluorescent lamps identical in construction with the known 40T12 WATT-MISER design having a 34 watt rating were built and tested with various phosphor coatings according to the present invention. More particularly, the evaluated phosphor coating consisted of a surface layer of the present phosphor combination which had been deposited at various coating weights and proportions on a base layer of different calcium haloapatite phosphors having a conventional 6.3 gm weight with objective lamp color points at 3000°, 3500°, and 4100° K. The lumen values and color rendering indices measured upon the test lamps are reported in a table below along with identification of the particular phosphor composition being evaluated.

TABLE

| EX | PHOSPHOR COATING | SURFACE LAYER WEIGHT Grams/Bulb | LUMENS 0 Hrs | 100 Hrs | 1000 Hrs | CRI |
|---|---|---|---|---|---|---|
| #1 (3000° K.) | Surface Layer 70% YEO* | 0 | 2866 | 2845 | — | 57 |
| | 30% BAMn** | 0.9 | 2787 | 2699 | — | 78 |
| | Base Layer Warm White*** | | | | | |
| #2 (3500° K.) | Surface Layer 64% YEO* | 0.5 | 2804 | 2661 | 2489 | 73.3 |
| | 36% BAMn** | 0.8 | 2776 | 2641 | 2505 | 82.6 |
| | Base Layer White*** | 1.2 | 2687 | 2559 | 2397 | 85.5 |
| #3 (4100° K.) | Surface Layer 55% YEO* | 0 | 2770 | 2713 | 2631 | 62 |
| | 45% BAMn** | 0.5 | 2761 | 2698 | 2601 | 81.8 |
| | Base Layer | 0.8 | 2762 | 2680 | 2591 | 85.3 |
| | Cool White*** | 1.2 | 2690 | 2613 | 2524 | 88.6 |

*$(Y_{.95}Eu_{.05})_2O_3$
**Divalent Europium Activated Barium Magnesium Aluminate Coactivated With Divalent Manganese $(Ba_{.9}Eu_{.15}Mg_{1.6}Mn_{.35}Al_{16}O_{27})$ as formulated.
***Calcium Haloapatite Activated With Divalent Manganese and Trivalent Antimony.

While it can be generally noted from the above test results that increasing the surface layer proportions in the phosphor coating produces lower lumen values, this result is accompanied by an increase in the color rendering index values. Reducing the proportions of yttrium oxide phosphor in the illustrated phosphor combinations also reduces cost as previously indicated.

The foregoing test results further illustrate the relative weight proportions needed in the overall phosphor coating to provide a minimum 73 CR1 value for the lamp illumination. As can be noted in this regard, both weight proportions of the individual phosphor components in the surface phosphor layer as well as weight proportions between said surface phosphor layer and the subjacent phosphor base layer will vary dependent upon the particular color temperature desired. In the Example #1 embodiment, a 3000° K. lamp color temperature at a 78 CR1 value is provided with a 0.9 gm deposit having 70% of the rare earth oxide phosphor and 30% of the barium magnesium aluminate phosphor overlying a 6.3 gm deposit of a warm white calcium haloapatite phosphor base layer. A 73.3 CR1 value is achieved in the Example #2 embodiment for a 3500° K. lamp with a 0.5 gm surface layer having 64% rare earth oxide phosphor blended with 30% of the barium magnesium aluminate phosphor and which has been deposited on a 6.3 gm base layer of a calcium haloapatite phosphor having a white color point. Higher CR1 values are achieved in said embodiment upon increasing the relative weight proportion for said surface phosphor layer with respect tot he overall phosphor coating weight from 7.4% up to 16%. Similarly, the Example #3 embodiment illustrates a lamp according to the present invention demonstrating improved CR1 values in the range 81.8-88.6 at a 4100° K. color temperature with various weights of a surface phosphor layer having 55 weight percent of said rare earth oxide and 45 weight percent of said barium magnesium aluminate phosphors deposited upon a 6.3 gm deposit of a cool white calcium haloapitite phosphor base layer. The relative weight proportions of the surface phosphor layer in said embodiment range from 7.4% to 16% respectively, illustrating a still further unexpected relationship for the CR1 values achieved with the present phosphor coatings.

Figure 2:
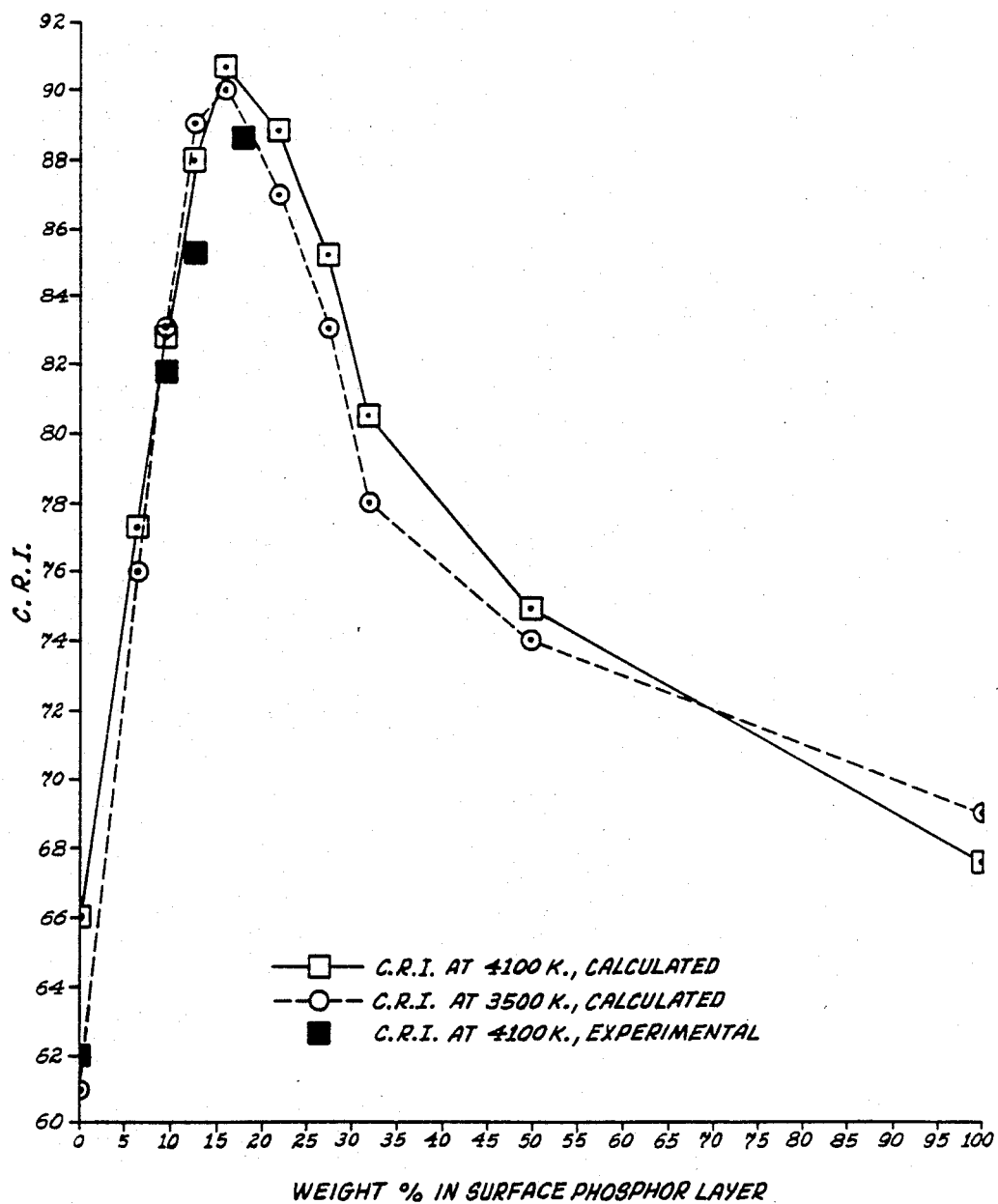
FIG. 2 is a graph depicting CR1 values achieved with the FIG. 1 lamp embodiment.

FIG. 2 is a graph depicting variation in both calculated and measured CR1 values for representative fluorescent lamps according to the present invention. Specifically, the variation in CR1 values is plotted with respect to the weight percent of the surface phosphor layer in the overall multilayer phosphor coating for lamp color temperatures at 3500° K. and 4100° K. It can be first noted from the plotted relationship that an optimum CR1 value occurs for the present phosphor coating at about a 15-20% surface phosphor layer content in the overall phosphor coating. It can further be noted from the plotted relationship that both increase and decrease in the CR1 values are non-proportional with respect to the surface phosphor layer proportions. It can likewise be noted from said plotted relationship that a reasonable correspondence exists between calculated and measured CR1 values for the 4100° K. lamp illustrated. Finally, it can be noted from the plotted relationship that while the desired minimum 73 CR1 value can be achieved at surface phosphor layer levels up to 60 weight percent there would only be lower CR1 values achieved upon exceeding the 30 weight percent content herein specified with higher phosphor costs also resulting therefrom.

It will be apparent from the foregoing description that a particular two component phosphor combination has been provided demonstrating general improvement in low pressure mercury discharge type fluorescent lamps used for general illumination. It will also be apparent, however, that various modifications can be made in the present phosphor combination that above specifically illustrated without departing from the true spirit and scope of this invention. For example, minor modification can be made in the composition of the individual phosphor components selected as already above indicated to modify the lamp color point, if desired. Consequently, it is intended to limit the present invention only by the scope of the following claims.

I claim:

1. A fluorescent lamp providing white color illumination at a color temperature in the approximate range 2700°-5000° K. along with improved color rendition which comprises a sealed tubular shaped glass envelope enclosing electrodes at its ends and a discharge-sustaining fill to generate a low pressure mercury discharge within said glass envelope and a phosphor coating located on the inner glass surface which converts said mercury discharge to said white color illumination, said phosphor coating comprising a surface phosphor layer utilizing a uniform blend of a first phosphor which is divalent europium activated barium magnesium aluminate having a hexagonal crystalline structure and which further includes coactivation by divalent manganese ions sufficient to produce substantial green color emission with a second phosphor which is a trivalent europium activated rare earth oxide having a rare earth ion selected from yttrium, gadolinium, and lutetium, including mixtures of said rare earth ions, said surface phosphor layer being deposited on a base layer of calcium haloapatite phosphor which exhibits white color emission at approximately the same color point as achieved with said surface phosphor layer and which is in physical contact with the glass surface, said divalent europium activated barium magnesium aluminate phosphor having a manganese ion content residing in the range from approximately 0.1 mole up to approximately 0.4 mole of manganese ion per 2 moles of the combined total of magnesium plus manganese ions in said phosphor while the europium ion content hereof resides in the approximate range 0.1-0.4 mole per mole of said phosphor, said first and second phosphors in the surface phosphor layer being combined in preselected proportions to achieve the desired white color point and wherein the weight proportion of the second phosphor exceeds the weight proportion of the first phosphor, and wherein the weight proportion of said surface phosphor layer is maintained from about 5 weight percent up to about 30 weight percent of the total phosphor coating weight.

2. A lamp as in claim 1 wherein the second phosphor is trivalent europium activated yttrium oxide having a europium content in the range 0.01-0.2 moles per mole of phosphor.

3. A lamp as in claim 1 which exhibits a 4100° K. color point.

4. A lamp as in claim 6 wherein the barium magnesium aluminate phosphor component has the following chemical formula:

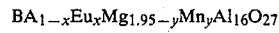

$$BA_{1-x}Eu_xMg_{1.95-y}Mn_yAl_{16}O_{27}$$

wherein x is in the approximate range 0.1-0.4, and y is in the approximate range 0.1-0.4.

5. A lamp as in claim 1 which exhibits a 3000° K. color point.

6. A lamp as in claim 5 wherein the barium magnesium aluminate phosphor component has the following chemical formula as formulated:

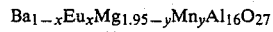

$$Ba_{1-x}Eu_xMg_{1.95-y}Mn_yAl_{16}O_{27}$$

wherein x is in the approximate range 0.1-0.4, and y is in the approximate range 0.1-0.4.

7. A lamp as in claim 1 which exhibits a 3500° K. color point.

8. A lamp as in claim 7 wherein the barium magnesium aluminate phosphor component has the following chemical formula as formulated:

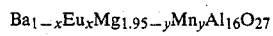

$$Ba_{1-x}Eu_xMg_{1.95-y}Mn_yAl_{16}O_{27}$$

wherein x is in the approximate range 0.1-0.4, and y is in the approximate range 0.1-0.4.

* * * * *